United States Patent
Hase et al.

[11] Patent Number: 5,951,915
[45] Date of Patent: Sep. 14, 1999

[54] PHOSPHORESCENT PHOSPHOR

[75] Inventors: Takashi Hase, Ebina; Noboru Kotera, Odawara; Morio Hayakawa, Kanagawa; Norio Miura, Isehara; Hitoshi Sakamoto, Hiratsuka, all of Japan

[73] Assignee: Kasei Optonix, Ltd., Tokyo, Japan

[21] Appl. No.: 09/101,762

[22] PCT Filed: Jul. 30, 1996

[86] PCT No.: PCT/JP96/02149

§ 371 Date: Jul. 20, 1998

§ 102(e) Date: Jul. 20, 1998

[87] PCT Pub. No.: WO97/27267

PCT Pub. Date: Jul. 31, 1997

[30] Foreign Application Priority Data

Jan. 22, 1996 [JP] Japan ............................. 8-8630
Mar. 12, 1996 [JP] Japan ............................ 8-54955

[51] Int. Cl.[6] ............................. C09K 11/59; C09K 11/66
[52] U.S. Cl. ............................. 252/301.4 F; 252/301.6 F
[58] Field of Search ........................ 252/301.6 F, 301.4 F

[56] References Cited

U.S. PATENT DOCUMENTS 3,544,482  12/1970  Barry ............................... 252/301.4 R
3,676,361  7/1972  Datta ............................... 252/301.4 F
5,231,328  7/1993  Hisamune et al. ................... 313/487
5,839,718  11/1998  Hase et al. ....................... 252/301.4 F

FOREIGN PATENT DOCUMENTS 48-37714  11/1973  Japan.
48-37715  11/1973  Japan.
50-49177  5/1975  Japan.
50-49178  5/1975  Japan.
7-11250  1/1995  Japan.
8-73845  3/1996  Japan.
8-127772  5/1996  Japan.

OTHER PUBLICATIONS

Chem. Abstract citation for JP 9–194,833, Jul. 29, 1997.

*Primary Examiner*—C. Melissa Koslow
*Attorney, Agent, or Firm*—Oblon, Spivak, McClelland, Maier & Neustadt, P.C.

[57] ABSTRACT

A phosphorescent phosphor represented by $m(Sr_{1-a},M^1_a)O \cdot n(Mg_{1-b}, M^2_b)O \cdot 2(Si_{1-c},Ge_c)O_2:Eu_xLn_y$, wherein $M^1$ is Ca and/or Ba, $M^2$ Be, Zn and/or Cd, Ln is Sc, Y, La, Ce, Pr, Nd, Sm, Gd, Tb, Dy, Ho, Er, Tm, Yb, Lu, B, Al, Ga, In, Tl, Sb, Bi, As, P, Sn, Pb, Ti, Zr, Hf, V, Nb, Ta, Mo, W, Cr and/or Mn, and wherein a, b, c, m, n, x and y are within ranges of $0 \leq a \leq 0.8$, $0 \leq b \leq 0.2$, $0 \leq c \leq 0.2$, $1.5 \leq m \leq 3.5$, $0.5 \leq n \leq 1.5$, $1 \times 10^{-5} \leq x \leq 1 \times 10^{-1}$, and $1 \times 10^{-5} \leq y \leq 1 \times 10^{-1}$, and which contains a halogen element such as F, Cl, Br or I in an amount within range of from $1 \times 10^{-5}$ to $1 \times 10^{-1}$ g·atm/mol of the host material.

4 Claims, 11 Drawing Sheets

PHOSPHORESCENT PHOSPHOR

TECHNICAL FIELD

The present invention relates to an europium-activated silicate type phosphorescent phosphor which is excellent in weather resistance, has a long afterglow characteristic and exhibits blue to green emission under excitation with ultraviolet rays and/or visible light rays, and which is useful as a light source or a display in a dark place such as indoor or outdoor or in water.

BACKGROUND ART

A phosphorescent phosphor is a phosphor which continues to emit fluorescence even after termination of excitation after some excitation is imparted to the phosphor to emit fluorescence. For a phosphorescent phosphor, along with diversification and high functionalization of display, multi-coloring, long afterglow and improved weather resistance of a phosphorescent phosphor are desired. With conventional phosphorescent phosphors, the types of colors of the fluorescence and afterglow were limited, the weather resistance was poor, and the afterglow time was short.

As a blue-emitting phosphorescent phosphor, a (Ca,Sr)S:Bi phosphor is known. As a yellowish green-emitting phosphorescent phosphor, a ZnS:Cu phosphor is known, and as a red-emitting phosphorescent phosphor, a (Zn,Cd)S:Cu phosphor is known.

However, the above-mentioned (Ca,Sr)S:Bi phosphor is not practically used at present, since the chemical stability of the host material is extremely poor, and the luminance and afterglow characteristics are inadequate. On the other hand, the (Zn,Cd)S:Cu phosphor is not practically used at present, since Cd which is a toxic substance, occupies almost a half of the host material, and the luminance and afterglow characteristics are not satisfactory. ZnS:Cu is also susceptible to decomposition by ultraviolet rays in the presence of moisture and is likely to be blackened, and the afterglow characteristics are also unsatisfactory, but it is inexpensive and is used mostly for face plates of clocks or for indoor use such as emergency escape signs.

DISCLOSURE OF THE INVENTION

The present invention is to overcome the above drawbacks and to provide a phosphorescent phosphor which has a long afterglow characteristic and blue to green emission and which is further chemically stable and excellent in weather resistance.

Namely, the present invention is a phosphorescent phosphor which has the following construction and which exhibits blue to green emission.

(1) In an Eu-activated silicate phosphorescent phosphor, a phosphorescent phosphor represented by a compositional formula $m(Sr_{1-a}M^1{}_a)O.n(Mg_{1-b}M^2{}_b)O.2(Si_{1-c}Ge_c)O_2:Eu_xLn_y$, wherein $M^1$ is at least one element selected from Ca and Ba, $M^2$ is at least one element selected from Be, Zn and Cd, and the coactivator Ln is at least one element selected from Sc, Y, La, Ce, Pr, Nd, Sm, Gd, Tb, Dy, Ho, Er, Tm, Yb, Lu, B, Al, Ga, In, Tl, Sb, Bi, As, P, Sn, Pb, Ti, Zr, Hf, V, Nb, Ta, Mo, W, Cr and Mn, and wherein a, b, c, m, n, x and y are within the following ranges, and said phosphor contains at least one halogen element selected from F, Cl, Br and I in an amount within a range of from $1\times10^{-5}$ to $1\times10^{-1}$ g·atm/mol of the host material:

$0 \leq a \leq 0.8$
$0 \leq b \leq 0.2$
$0 \leq c \leq 0.2$
$1.5 \leq m \leq 3.5$
$0.5 \leq n \leq 1.5$
$1\times10^{-5} \leq x \leq 1\times10^{-1}$
$1\times10^{-5} \leq y \leq 1\times10^{-1}$.

(2) The phosphorescent phosphor according to the above (1), wherein the above value m satisfies a condition represented by $1.7 \leq m \leq 3.3$.

(3) The phosphorescent phosphor according to the above (1) or (2), wherein the above coactivator Ln is at least one element selected from Dy, Nd, Tm, Sn, In and Bi.

(4) The fluorescent phosphor according to any one of the above (1) to (3), which exhibits thermoluminescence at a temperature of at least room temperature, when heated after excitation with ultraviolet rays and/or visible light rays within a range of from 140 to 450 nm.

Figure 1:
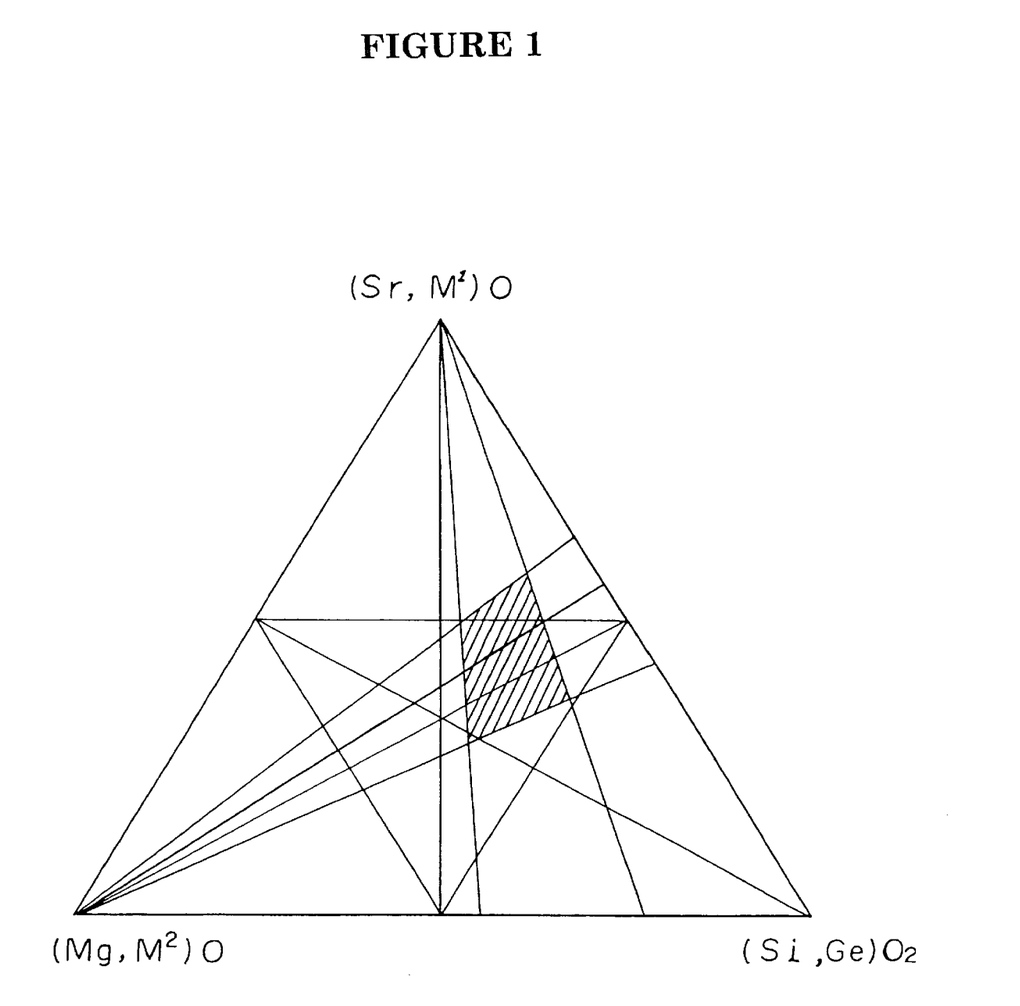
FIG. 1 is a graph showing a ternary state diagram of a $(Sr,M^1)O$—$(Mg,M^2)O$—$(Si,Ge)O_2$ type oxide which is the host material of the phosphorescent phosphor of the present invention.

The present inventors have conducted a study primarily on a phosphor host material of $(Sr,M^1)O$—$(Mg,M^2)O$—$(Si,Ge)O_2$ type ($M^1$=at least one of Ca and Ba, and $M^2$=at least one of Be, Zn and Cd), whereby they have found that a phosphor host material suitable for a long afterglow characteristic is present in the compositional region shown by the hatched lines in FIG. 1.

Namely, a phosphor represented by the compositional formula $m(Sr_{1-a},M^1{}_a)O.n(Mg_{1-b},M^2{}_b)O.2(Si_{1-c},Ge_c)O_2$, wherein m and n are within ranges of $1.5 \leq m \leq 3.5$, and $0.5 \leq n \leq 1.5$, is suitable.

And, in the present invention, the above phosphor host material is activated with Eu and at the same time, co-activated with Ln (at least one element selected from Sc, Y, La, Ce, Pr, Nd, Sm, Gd, Tb, Dy, Ho, Er, Tm, Yb, Lu, B, Al, Ga, In, Tl, Sb, Bi, As, P, Sn, Pb, Ti, Zr, Hf, V, Nb, Ta, Mo, W, Cr and Mn), and a halogen element (at least one element selected from F, Cl, Br and I) is incorporated, whereby it has been successful to optimize the luminescence center (Eu) and the incorporated elements, and it has been successful to obtain a blue to green-emitting phosphorescent phosphor which has a very long afterglow characteristic and which is chemically stable and excellent in weather resistance. Among the above co-activators Ln, Dy, Nd, Tm, Sn, In and Bi are particularly excellent.

In the compositional formula of the present invention, the substitution amount a of Sr is suitably within a range of $0 \leq a \leq 0.8$, preferably $0 \leq a \leq 0.4$. If it exceeds 0.8, the effect of improving the afterglow characteristic tends to be small. The substitution amount b of $M^2$ element is suitably within a range of $0 \leq b \leq 0.2$, preferably $0 \leq b \leq 0.1$. If it exceeds 0.2, the effect of improving the afterglow characteristic tends to be small. The amount C of Ge substituted for Si is suitably within a range of $0 \leq c \leq 0.2$, preferably $0 \leq c \leq 0.1$. If it exceeds 0.2, the effect of improving the afterglow characteristic tends to be small, and the luminance also tends to decrease.

Further, the above m and n values determining the compositional ratio of $m(Sr_{1-a},M^1{}_a)O$, $n(Mg_{1-b},M^2{}_b)O$ and $2(Si_{1-c},Ge_c)O_2$, as components constituting the host material of the phosphor, are suitably within ranges of $1.5 \leq m \leq 3.5$ and $0.5 \leq n \leq 1.5$, preferably $1.7 \leq m \leq 3.3$ and $0.7 \leq n \leq 1.3$. If they depart from such ranges, a compound other than the desired compound will be formed, or the starting material oxides will remain, whereby the luminance will decrease.

The incorporated amount x (g·atm) of the activator Eu is suitably within a range of $1\times10^{-5} \leq x \leq 1\times10^1$, preferably $1\times10^{-4} \leq x \leq 5\times10^{-2}$. If it is less than $1\times10^{-5}$, the numbers of the luminescence center tend to diminish, and the desired luminance can not be obtained. Further, if it exceeds $1\times10^{-1}$, concentration quenching takes place, whereby the luminance decreases, and the afterglow characteristic decreases.

The incorporated amount y (g·atm) of the co-activator element Ln is suitably within a range of $1\times10^{-5} \leq y \leq 1\times10^{-1}$, preferably $1\times10^{-4} \leq y \leq 5\times10^{-2}$. If it is less than $1\times10^{-5}$, no effect for the afterglow characteristic tends to be obtained, and if it exceeds $1\times10^{-1}$, the co-activator element undergoes light emission, whereby an emission in a range of blue to green can not be obtained.

The halogen element incorporated to the phosphor of the present invention serves partially as a flux for crystal growth and for diffusion of the luminescence center and the co-activator element Ln and improves the luminance and the afterglow characteristic. The incorporated amount z(g·atm) of the halogen element is suitably $1\times10^{-5} \leq z \leq 1\times10^{-1}$, preferably $1\times^{-4} \leq z \leq 1\times10^2$ as a value analyzed after the washing treatment, etc. If it exceeds $1\times10^{-1}$, the phosphor tends to sinter, whereby treatment into a powder tends to be difficult, and it is less than $1\times10^{-5}$, a drawback such as a decrease in the afterglow and spontaneous emission luminance, tends to result.

And, the phosphorescent phosphor of the present invention exhibits thermoluminescence at a temperature fat least room temperature, when the phosphor is heated after excitation with ultraviolet rays and/or visible light rays within a range of from 140 to 450 nm.

The phosphorescent phosphor of the present invention is synthesized as follows.

With respect to the materials for the phosphor, the host material-constituting elements Sr, $M^1$ ($M^1$=at least one of Ca and Ba), Mg, $M^2$ ($M^2$=Be, Zn, Cd), Si and Ge, and activator Eu and co-activator Ln, are used in the form of the respective oxides or in the form of salts such as carbonates, nitrates or chlorides which can readily be converted to oxides by baking. Further, the halogen elements are used in the form of ammonium salts, alkali metal salts or halogenated compounds of the above-mentioned constituting elements (the host material-constituting elements, activator element Eu or co-activator element Ln). And, they are sampled so that the composition will be stoichiometrically within the above compositional formula and thoroughly mixed in a wet system or in a dry system. Rare earth materials may be mixed to one another by co-precipitation. This mixture is filled in a heat resistant container such as an alumina crucible and baked at least once at a temperature of from 800 to 1400° C. for from 1 to 12 hours in a reducing atmosphere of hydrogen-containing neutral gas or in a reducing atmosphere consisting of carbon element-containing gas, e.g. $CO_x$ gas, $CS_2$ gas etc. When baking is carried out in a plurality of times, the final baking step is carried out necessarily in a reducing atmosphere. This baked product is pulverized and then subjected to washing with a weak mineral acid, washing with water, drying, sieving, etc., to obtain the phosphorescent phosphor of the present invention.

Figure 2:
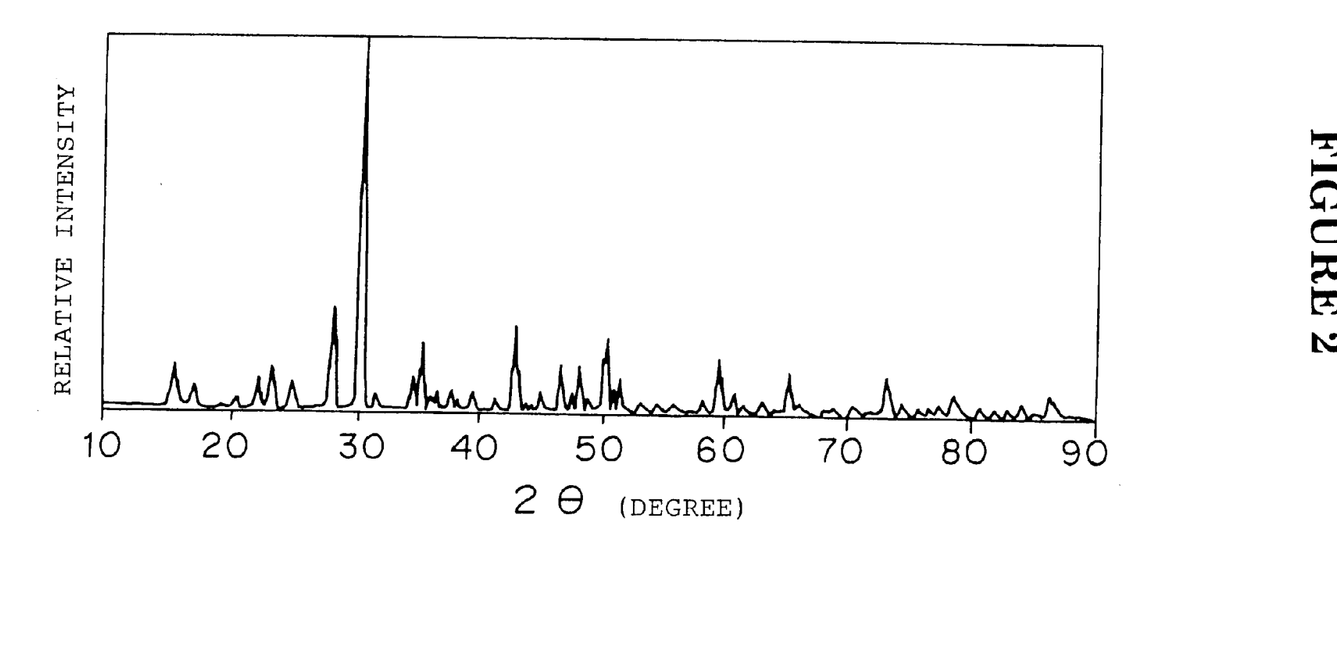
FIG. 2 is an X-ray diffraction pattern whereby the crystal structure of the phosphorescent phosphor synthesized in Example 1 was confirmed.
Figure 3:
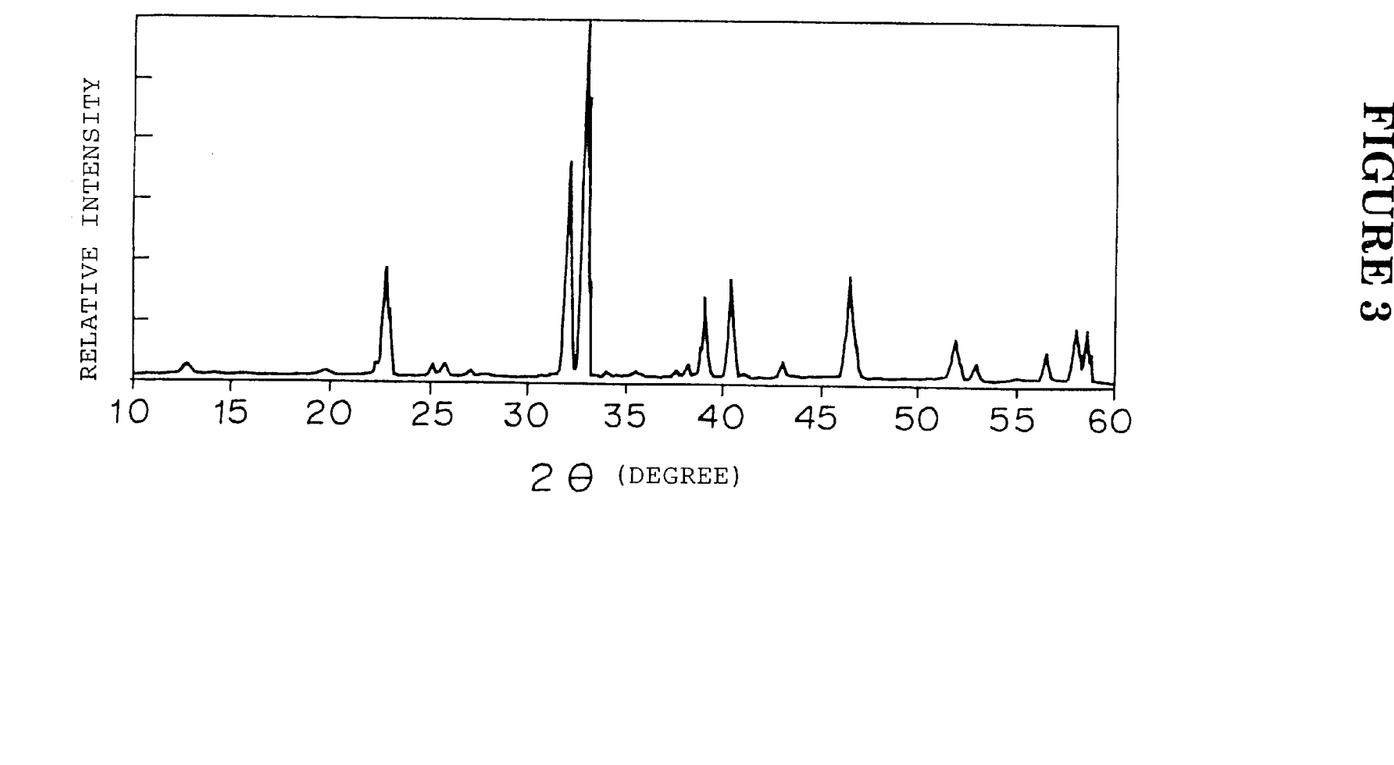
FIG. 3 is an X-ray diffraction pattern whereby the crystal structure of the phosphorescent phosphor synthesized in Example 2 was confirmed.

FIG. 2 is an X-ray diffraction pattern, whereby the crystal structure of the phosphorescent phosphor $Sr_{1.995}MgSi_2O_7:Eu_{0.005}, Dy_{0.025}, Cl_{0.025}$ synthesized in Example 1, was confirmed. FIG. 3 is an X-ray diffraction pattern whereby the crystal structure of the phosphorescent phosphor $Sr_{2.97}MgSi_2O_8:Eu_{0.03}, Dy_{0.025}, Cl_{0.025}$ synthesized in Example 2, was confirmed. Even when a part of Sr, Mg or Si in these phosphor compositions, was substituted by other elements within the range defined in the Claims, substantially the same results were obtained.

Figure 4:
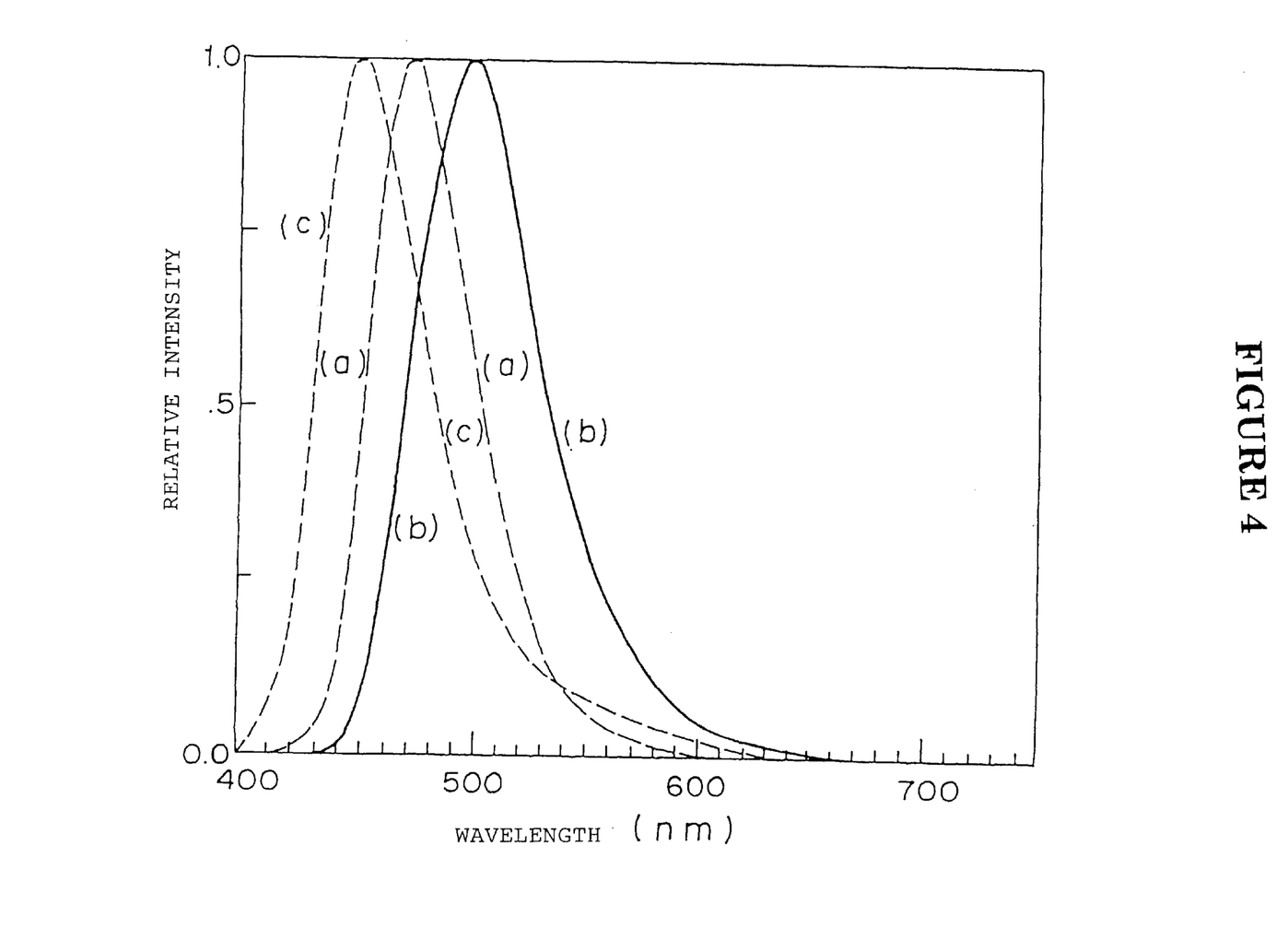
FIG. 4 is a graph showing emission spectra when the phosphorescent phosphors synthesized in Examples 1, 3 and 5 were excited with ultraviolet rays of 365 nm.
Figure 5:
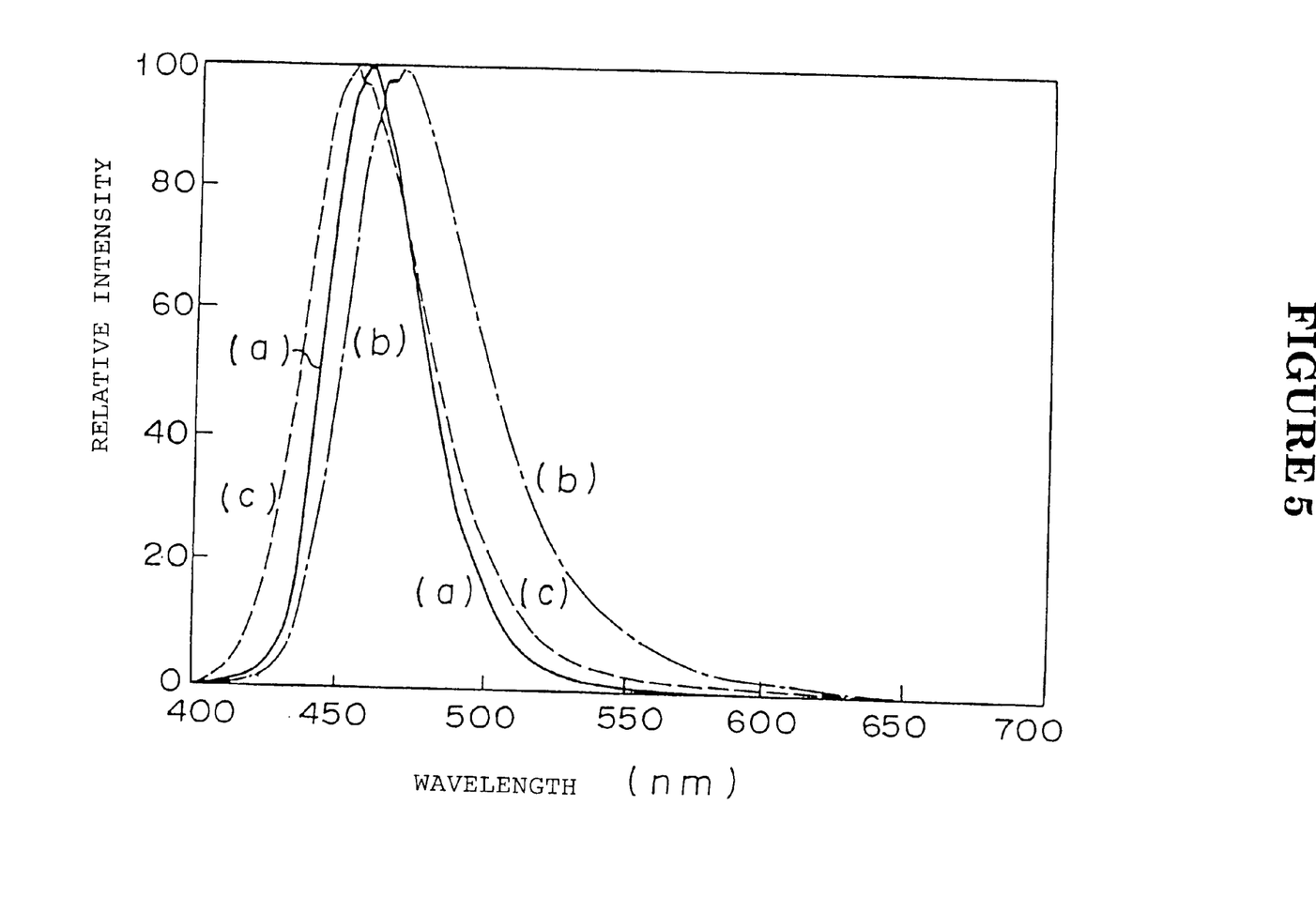
FIG. 5 is a graph showing emission spectra when the phosphorescent phosphors synthesized in Examples 2, 4 and 6 were excited with ultraviolet rays of 365 nm.

FIG. 4 shows emission spectra, under excitation with ultraviolet rays of 365 nm, of the phosphorescent phosphor (curve a) of Example 1, the phosphorescent phosphor $Sr_{1.195}Ca_{0.8}MgSi_2O_7:Eu_{0.005},Dy_{0.025},Br_{0.025}$ (curve b), synthesized in Example 3 and the phosphorescent phosphor $Sr_{0.995}BaMgSi_2O_7:Eu_{0.005},Dy_{0.025},Br_{0.025}$ (curve b) synthesized in Example 5, and the respective emission peak wavelengths were 470 nm, 500 nm and 450 nm. Further, FIG. 5 shows emission spectra, under excitation with ultraviolet rays of 365 nm, of the phosphorescent phosphor (curve a) of Example 2, the phosphorescent phosphor $Sr_{2.07}Ca_{0.9}Mgsi_2O_8:Eu_{0.03},Dy_{0.025},Cl_{0.025}$ (curve b) synthesized in Example 4 and the phosphorescent phosphor $Sr_{2.375}Ba_{0.6}MgSi_2O_8:Eu_{0.025}Dy_{0.3}.Br_{0.015}$ (curve c) synthesized in Example 6, and the respective emission peak wavelengths were 460 nm, 471 nm and 450 nm. Even if a part of these phosphor compositions, was substituted by other elements within the range defined in the Claims, substantially the same results were obtained.

Figure 6:
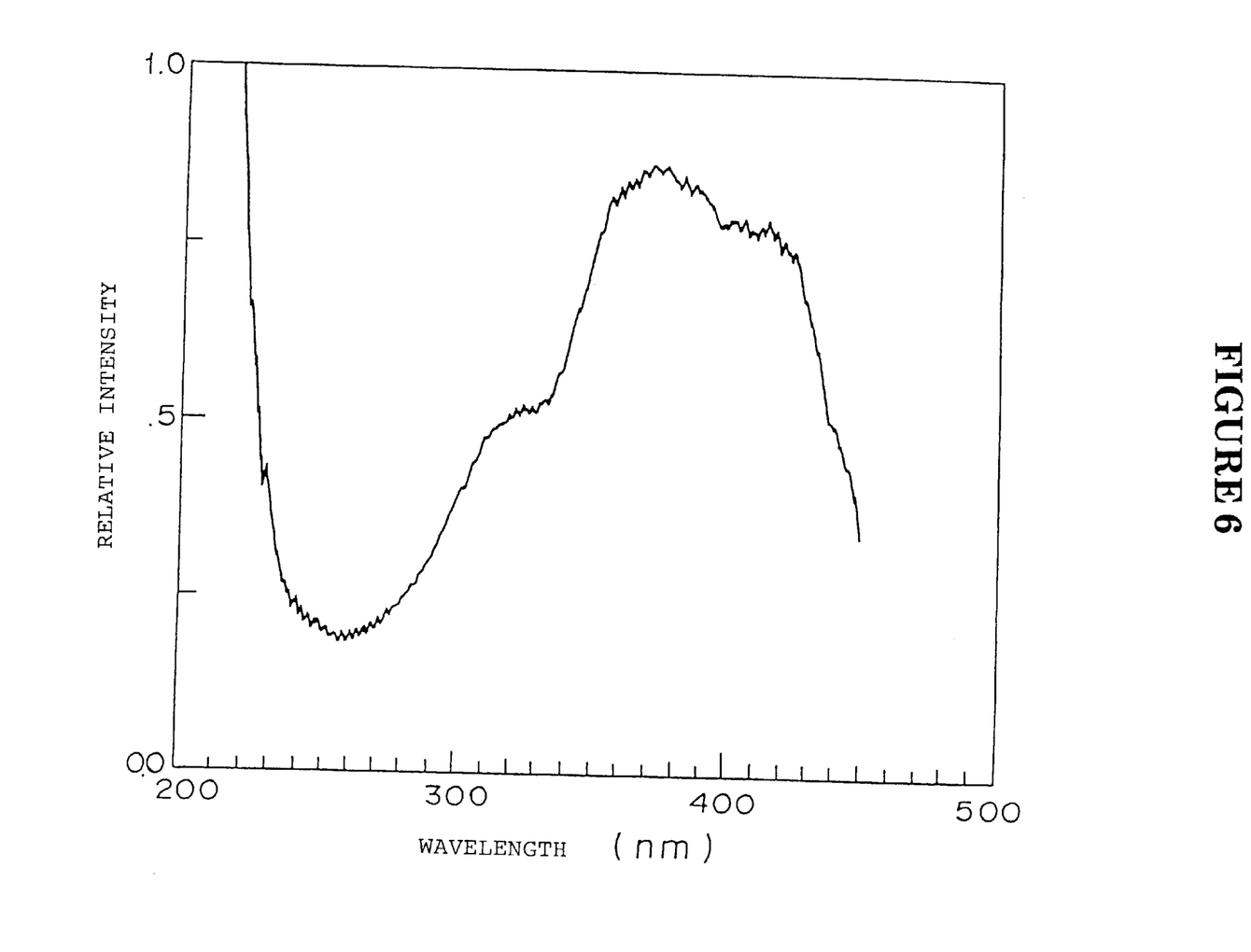
FIG. 6 is a graph showing the excitation spectrum at each emission spectrum peak of the phosphorescent phosphor of Example 1.
Figure 7:
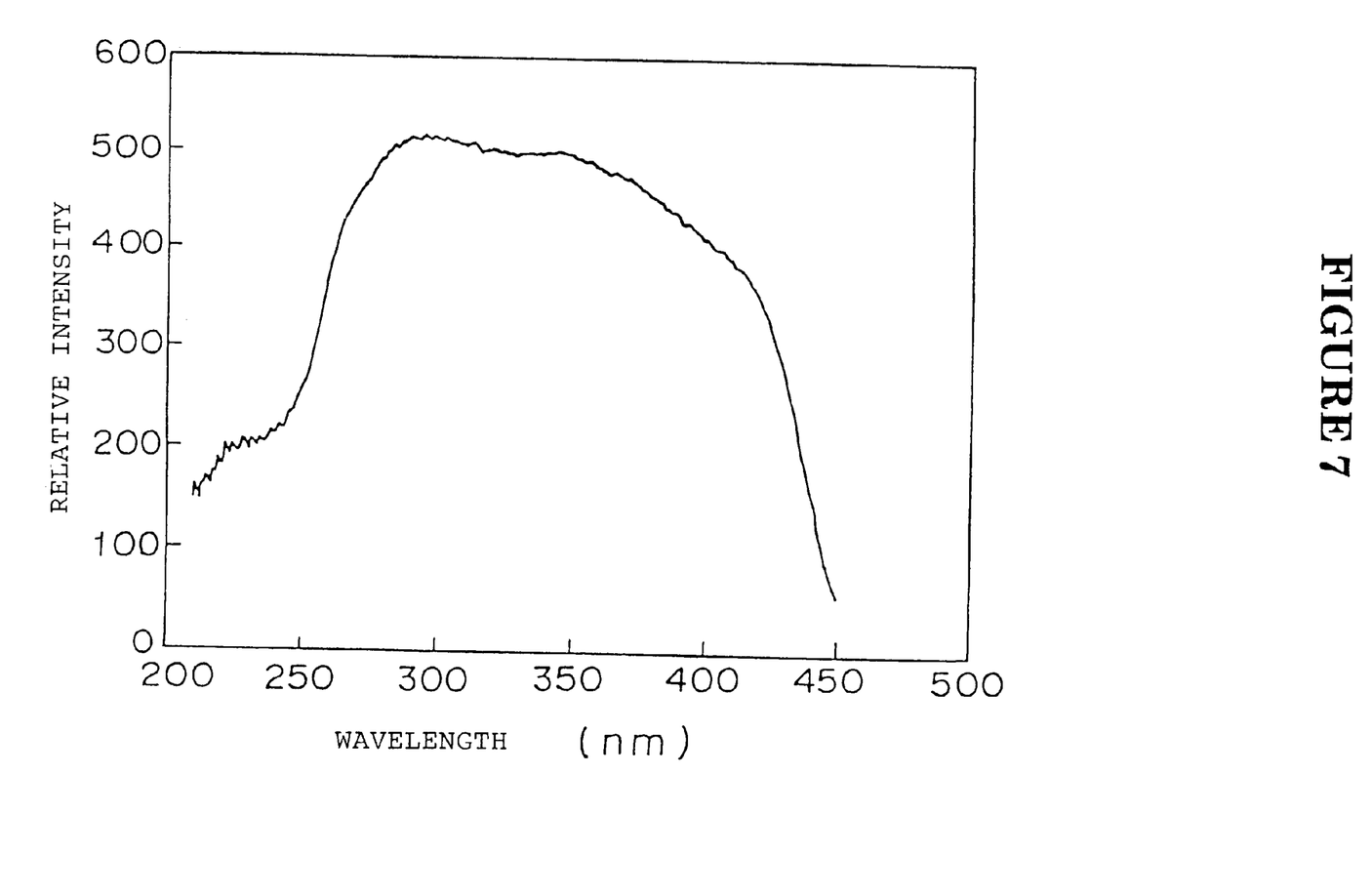
FIG. 7 is a graph showing the excitation spectrum at each emission spectrum peak of the phosphorescent phosphor of Example 2.

FIG. 6 is one wherein using the phosphorescent phosphor of Example 1, the region of the excited spectrum was measured and shown. FIG. 7 is one wherein using the phosphorescent phosphor of Example 2, the region of the excited spectrum was measured and shown. In the measurement of the region of the excited spectrum, the intensity of 460 nm (output light) was plotted when the exciting wavelength of light irradiated to the sample, was varied while the spectrum wavelength on the output side of the spectrophotometer, is fixed at 460 nm, whereby the ordinate represents the relative emission intensity of 460 nm, and the abscissa represents the wavelength of the scanning exciting light. Even if a part of this phosphor composition was substituted by other elements within the range as defined in the Claims, substantially the same results were obtained.

Figure 8:
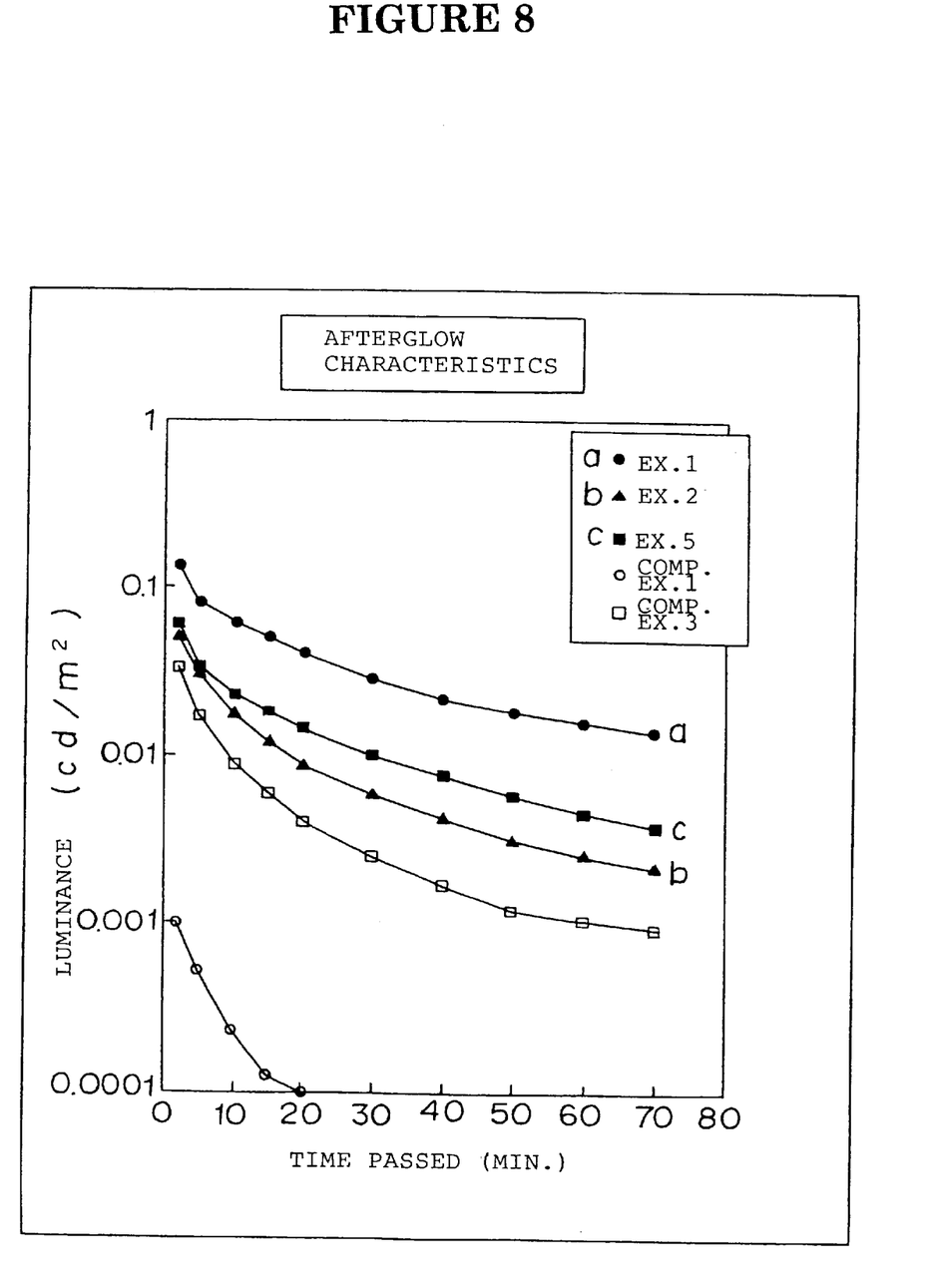
FIG. 8 is a graph wherein the afterglow characteristics were compared among the blue to green-emitting phosphorescent phosphors of Examples 1, 3 and 5 and Comparative Example 1 and the yellowish green-emitting phosphorescent phosphor of Comparative Example 3.

In FIG. 8, the phosphorescent phosphor of Example 1 (the emission spectrum peak wavelength: 470 nm), the phosphorescent phosphor of Example 3 (the emission spectrum peak wavelength: 500 nm), the phosphorescent phosphor of Example 5 (the emission spectrum peak wavelength: 450 nm), the phosphorescent phosphor of Comparative Example 1 $(Sr_{1.995}MgSi_2O_7:Eu_{0.005}$, the emission spectrum peak wavelength: 470 nm) and the phosphorescent phosphor of Comparative Example 3 (ZnS:Cu, the emission spectrum peak wavelength: 516 nm) were irradiated with 300 lux for 30 minutes by means of a day light color fluorescent lamp, and the afterglow characteristics upon expiration of 2 minutes after termination of the irradiation, were measured. Further, in FIG. 9, the phosphorescent phosphor of Example 2 (the emission spectrum peak wavelength: 460 nm), the phosphorescent phosphor of Example 4 (the emission spectrum peak wavelength: 471 nm), the phosphorescent phosphor of Example 6 (the emission spectrum peak wavelength: 450 nm), the phosphorescent phosphor of Comparative Example 2 $(Sr_{2.97}MgSi_2O_8:Eu_{0.03}$, the emission spectrum peak wavelength: 460 nm) and the phosphorescent phosphor of Comparative Example 3 (ZnS:Cu, the emission spectrum peak wavelength: 516 nm) were irradiated with 300 lux for 30 minutes by means of a day light color fluorescent lamp, and the afterglow characteristics upon expiration of 2 minutes after termination of irradiation, were measured. In each case, the measuring method was such that, as described above, the sample was irradiated with a 30 W day light color fluorescent lamp, and the afterglow of the phosphor after switching off the lamp, was determined by measuring the luminance of the afterglow by a luminance meter provided with a filter adjusted to luminosity curve.

Figure 9:
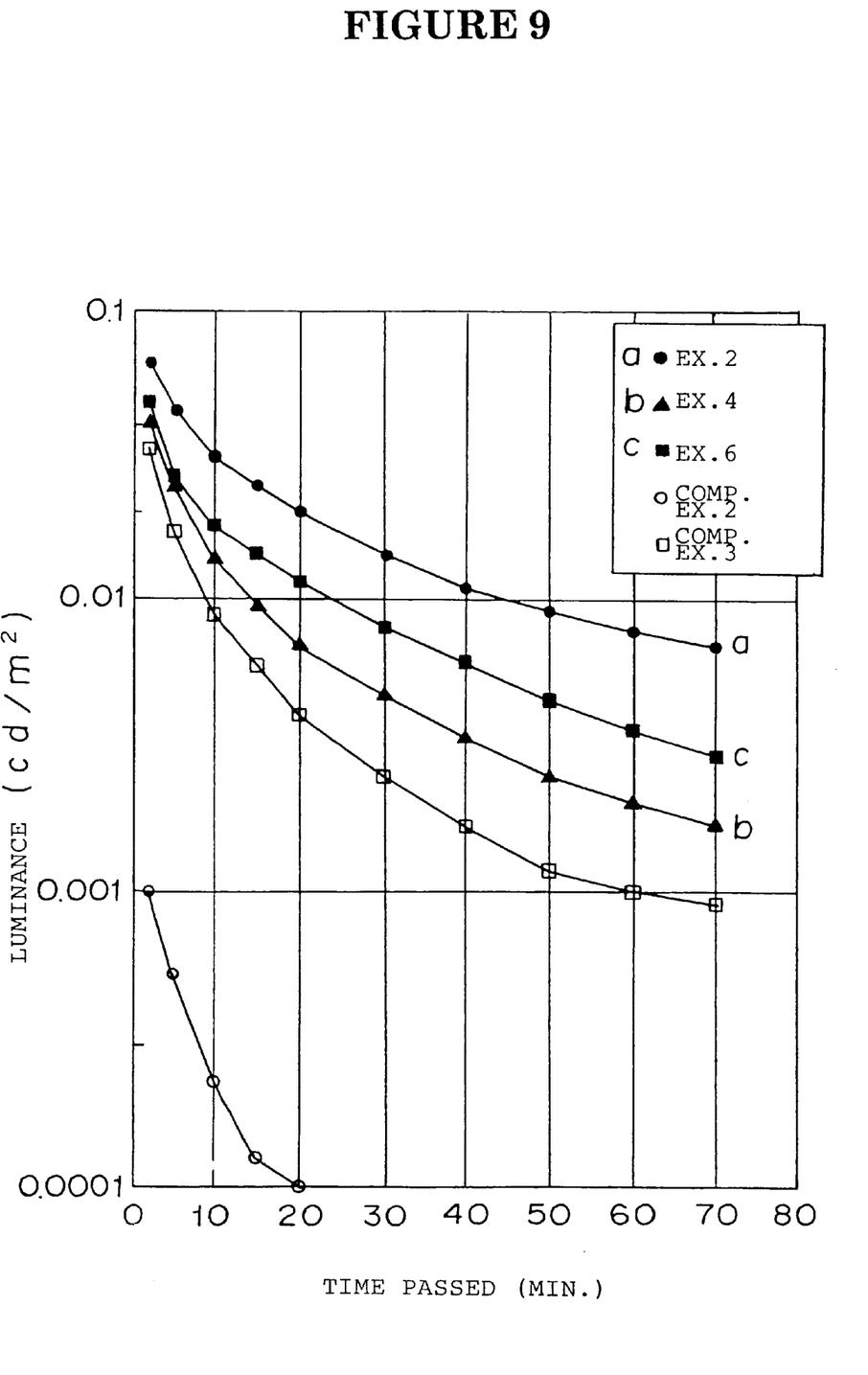
FIG. 9 is a graph wherein the afterglow characteristics were compared among the blue to green-emitting phosphorescent phosphors of Examples 2, 4 and 6 and Comparative Example 2 and the yellowish green-emitting phosphorescent phosphor of Comparative Example 3.

As is evident from FIGS. 8 and 9, the phosphorescent phosphor having an emission spectrum peak wavelength of 470 nm of Example 1 has an extremely remarkable afterglow characteristic as compared with Comparative Example 1. Further, it is evident that the phosphorescent phosphor having an emission spectrum peak wavelength of 460 nm of Example 2 has an extremely remarkable afterglow characteristic as compared with Comparative Example 2. Further, it is evident that the phosphorescent phosphors of Examples 4 and 6 have excellent afterglow characteristics as compared with the ZnS:Cu yellowish green-emitting phosphor of Comparative Example 3 which corresponds to a commercial product, although the emission colors are different. Furthermore, the respective phosphorescent phosphors of Examples 3, 4, 5 and 6 also have excellent afterglow characteristics as compared with the ZnS:Cu yellowish green-emitting phosphor of Comparative Example 3 which corresponds to a commercial product, although the emission colors are different.

Figure 10:
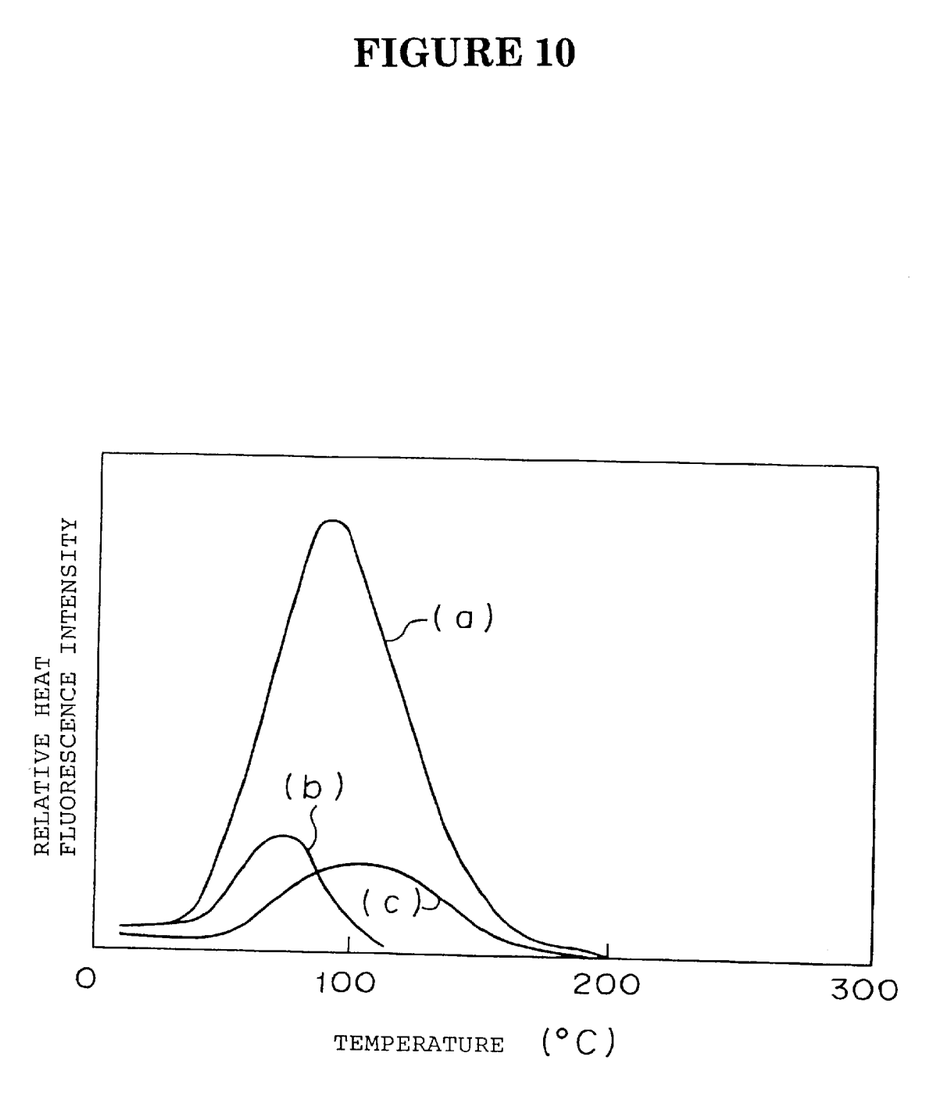
FIG. 10 is a graph showing the thermoluminescence characteristics (glow curves) of the phosphorescent phosphors of Examples 1, 3 and 5.
Figure 11:
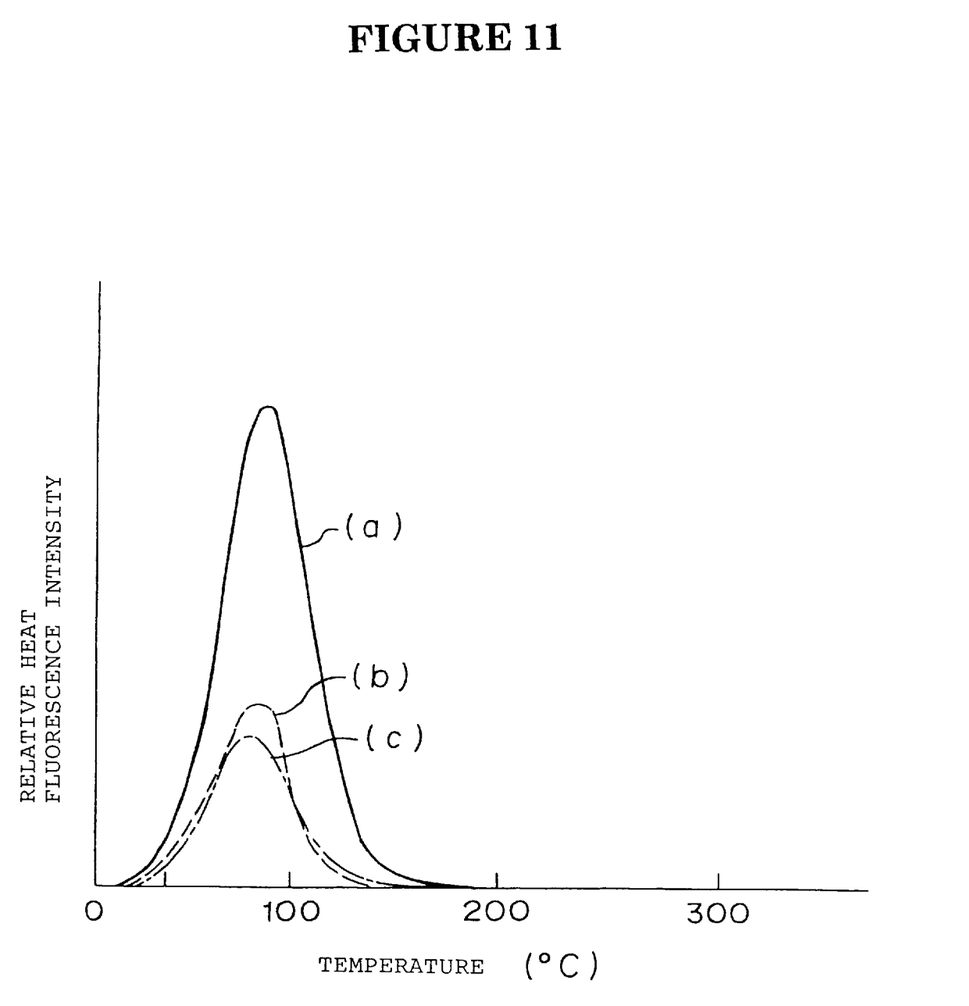
FIG. 11 is a graph showing the thermoluminescence characteristics (glow curves) of the phosphorescent phosphors of Examples 2, 4 and 6.

FIG. 10 is a graph showing the results, when the respective phosphorescent phosphors of Examples 1, 3 and 5 were irradiated with 300 lux for 15 seconds by a day light color fluorescent lamp, and the thermoluminescence characteristic (glow curve) upon expiration of 1 minute after termination of irradiation was measured at a temperature raising rate of about 8 to 10° C./sec by means of TLD reader (KYOKKO TLD-1300 improved type), manufactured by Kasei Optonix, Ltd. FIG. 11 is a graph showing the results, when the phosphorescent phosphors of Examples 2, 4 and 6 were irradiated with 300 lux for 15 seconds by a day light color fluorescent lamp as described above, and the thermoluminescence characteristic (glow curve) upon expiration of 1 minute after termination of irradiation, was measured by TLD reader (KYOKKO TLD-1300 improved type) manufactured by Kasei Optonix, Ltd. As is evident from curves a to c in FIG. 10 and curves a to c in FIG. 11, the phosphorescent phosphors of Examples 1 to 6 exhibit thermoluminescence when heated at the above-mentioned temperature-raising speed within a temperature range of at least room temperature.

The phosphorescent phosphor of the present invention exhibits a very high luminance afterglow characteristic as described above and is excellent in weather resistance and chemically stable, and even when compared with the conventional ZnS type phosphorescent phosphors, it makes application possible not only to indoors but also to a wide range of applications outdoors. For example, it may be coated on the surfaces of various articles, or it may be mixed in plastics, rubbers, polyvinyl chlorides, synthetic resins or glass and may be applied widely in the form of molded products or fluorescent films, for example, for various signs for traffic safety (such as traffic armbands, traffic control gloves, reflectors of vehicles, reflector flags, signals, road signs, emergency ropes, footgears, safety umbrellas, sticks for blind persons, stickers, knapsacks, raincoats or safety covers), indicators (such as telephone dial covers, switches, slip prevention of stair case, escape guide signals, tires, mannequins, fire extinguishers, keys, doors, fluorescent lamps or display tapes), ornaments (such as artificial flowers, accessories or interior plates), various leisure articles (such as floats for fishing, toys, golf balls, ropes, kites, artificial trees or puzzles), clocks (such as face plates, hands or scales), office articles and office appliances (such as writing means, cardboards, scales, marker pens, seals, liquid crystal back lights, solar cells, calculators, printers or inks), educational articles and appliances (such as constellation plates, planet models, transparency, keyed instruments or maps) and building materials (such as concrete, guard rails, scales for construction work, scaffoldings for manholes, tiles, decorative laminated sheets, measuring apparatus or tape measures).

Especially when the phosphorescent phosphor of the present invention is used alone or as a blue to bluish green-emitting component phosphor for a high color rendering fluorescent lamp, and this is coated on a tubular wall of the fluorescent lamp and used as a fluorescent film for the fluorescent lamp, it continues to emit fluorescence with high luminance for a long period of time even when the lamp is suddenly off due to e.g. power breakdown, and thus it is useful also as an emergency fluorescent lamp.

BEST MODE FOR CARRYING OUT THE INVENTION

The present invention will be described in further detail with reference to the following Examples, but it is by no means restricted by the following Examples unless it exceeds the gist thereof.

EXAMPLE 1

| | |
|---|---|
| $SrCO_3$ | 29.5 g |
| MgO | 4.0 g |
| $SiO_2$ | 12.0 g |
| $Eu_2O_3$ | 0.09 g |

-continued

| | |
|---|---|
| $Dy_2O_3$ | 0.47 g |
| $NH_4Cl$ | 2.3 g |

The above starting materials were thoroughly mixed, packed into an alumina crucible and baked at 115° C. for 2 hours in a reducing atmosphere comprising 98% of nitrogen and 2% of hydrogen, by means of an electric furnace. The obtained baked product was pulverized and subjected to washing with water, drying and sieving to obtain a phosphorescent phosphor.

This phosphor had a composition of $Sr_{1.995}MgSi_2O_7:Eu_{0.005}$, $Dy_{0.025}Cl_{0.025}$ and showed an X-ray diffraction pattern of FIG. 2, and the emission spectrum under excitation with ultraviolet rays of 365 nm was as shown in FIG. 4 (curve a), whereby its emission peak wavelength had a blue-emitting phosphorescence of 470 nm. Further, the excitation spectrum was found to extend to a visible region, as shown in FIG. 6. The afterglow characteristic showed a long afterglow as shown in FIG. 8 (curve a). Further, the glow curve was as shown in FIG. 10. Furthermore, the emission peak wavelength of the phosphor, the afterglow characteristic (the emission intensity ratio of the emission intensities upon expiration of 2 minutes and 60 minutes after termination of irradiation as compared with a ZnS:Cu yellowish green-emitting phosphorescent phosphor being 100%) and the peak temperature value of the glow curve, are shown in Table 1.

EXAMPLE 2

| | |
|---|---|
| $SrCO_3$ | 43.8 g |
| MgO | 4.0 g |
| $SiO_2$ | 12.0 g |
| $Eu_2O_3$ | 0.53 g |
| $Dy_2O_3$ | 0.47 g |
| $NH_4Cl$ | 2.3 g |

The above starting materials were thoroughly mixed, packed into an alumina crucible and baked at 1150° C. for 2 hours in a reducing atmosphere comprising 98% of nitrogen and 2% of hydrogen by means of an electric furnace. The obtained baked product was pulverized and subjected to washing with water, drying and sieving to obtain a phosphorescent phosphor.

This phosphor had a composition of $Sr_{2.97}Mgsi_2O_8:Eu_{0.03}Dy_{0.025}Cl_{0.025}$ and showed an X-ray diffraction pattern of FIG. 3, and the emission spectrum under excitation with ultraviolet rays of 365 nm was as shown in FIG. 5 (curve a), whereby its emission peak wavelength had a blue-emitting phosphorescence of 460 Further, the excitation spectrum was found to extend to a visible region, as shown in FIG. 7. The afterglow characteristic showed a long afterglow, as shown in FIG. 9 (curve a). Further, the glow curve was as shown in FIG. 11. Furthermore, the emission peak wavelength of the phosphor, the afterglow characteristic (the emission intensity ratio of the emission intensities upon expiration of 2 minutes and 60 minutes after termination of irradiation, as compared with a ZnS:Cu yellowish green-emitting phosphorescent phosphor being 100%) and the peak temperature value of the glow curve, are shown in Table

EXAMPLE 3

| | |
|---|---|
| $SrCO_3$ | 17.6 g |
| $CaCO_3$ | 8.0 g |
| MgO | 4.0 g |
| $SiO_2$ | 12.0 g |
| $Eu_2O_3$ | 0.09 g |
| $Dy_2O_3$ | 0.47 g |
| $NH_4Br$ | 3.3 g |

The above starting materials were thoroughly mixed, packed into an alumina crucible and baked at 1200° C. for 2 hours in a carbon-reducing atmosphere by means of an electric furnace. The obtained baked product was pulverized and subjected to washing with water, drying and sieving to obtain a phosphorescent phosphor.

This phosphor had a composition of $Sr_{1.195}Ca_{0.8}Mgsi_2O_7Eu_{0.005}Dy_{0.025},Br_{0.025}$, and the emission spectrum under excitation with ultraviolet rays of 365 nm was as shown in FIG. 4 (curve b), whereby its peak wavelength had a green-emitting phosphorescence of 500 nm. Further, the afterglow characteristic showed a long afterglow, as shown in FIG. 8 (curve b). Further, the glow curve was as shown in FIG. 10 (curve b). Furthermore, the emission peak wavelength of the phosphor, the afterglow characteristic (the emission intensity ratio of the emission intensities upon expiration of 2 minutes and 60 minutes after termination of irradiation, as compared with a ZnS:Cu yellowish green-emitting phosphorescent phosphor being 100%) and the glow peak temperature, are shown in Table 1.

EXAMPLE 4

| | |
|---|---|
| $SrCO_3$ | 30.6 g |
| $CaCO_3$ | 9.1 g |
| MgO | 4.0 g |
| $SiO_2$ | 12.0 g |
| $Eu_2O_3$ | 0.52 g |
| $Dy_2O_3$ | 0.47 g |
| $NH_4Cl$ | 2.6 g |

The above starting materials were thoroughly mixed, packed into an alumina crucible and baked at 1200° C. for 2 hours in a reducing atmosphere consisting of carbon element-containing gas, e.g. $Co_x$ gas, $CS_2$ gas etc. The obtained baked product was pulverized and subjected to washing with water, drying and sieving to obtain a phosphorescent phosphor.

This phosphor had a composition of $Sr_{2.07}Ca_{0.9}Mgsi_2O_8:Eu_{0.03}Dy_{0.025}Cl_{0.02}$, and the emission spectrum under excitation with ultraviolet rays of 365 nm was as shown in FIG. 5 (curve b), whereby its peak had a bluish green-emitting phosphorescence of 471 nm. Further, the afterglow characteristic showed a long afterglow, as shown in FIG. 9 (curve b). Further, the glow curve was as shown in FIG. 11 (curve b). Furthermore, the emission peak wavelength of the phosphor, the afterglow characteristic (the emission intensity ratio of the emission intensities upon expiration of 2 minutes and 60 minutes after termination of irradiation, as compared with a ZnS:Cu yellowish green-emitting phosphorescent phosphor being 100%) and the glow peak temperature value, are shown in Table 1.

EXAMPLE 5

| | |
|---|---:|
| SrCO$_3$ | 14.7 g |
| BaCO$_3$ | 19.7 g |
| MgO | 4.0 g |
| SiO$_2$ | 12.0 g |
| Eu$_2$O$_3$ | 0.09 g |
| Dy$_2$O$_3$ | 0.47 g |
| NH$_4$Br | 2.68 g |

The above starting materials were thoroughly mixed, packed into an alumina crucible and baked at 1200° C. for 3 hours in a reducing atmosphere comprising 97% of nitrogen and 3% of hydrogen, by means of an electric furnace. The obtained baked product was pulverized and subjected to washing with water, drying and sieving to obtain a phosphorescent phosphor.

This phosphor had a composition of $Sr_{0.995}Ba_{1.0}MgSi_2O_7:Eu_{0.005}, Dy_{0.025}, Br_{0.25}$, and the emission spectrum under excitation with ultraviolet rays of 365 nm was as shown in FIG. 4 (curve c), whereby its peak had a bluish green-emitting phosphorescence of 450 nm. Further, the afterglow characteristic showed a long afterglow, as shown in FIG. 8 (curve c). Further, the glow curve was as shown in FIG. 10 (curve c). Furthermore, the emission peak value of the phosphor, the afterglow characteristic (the emission intensity ratio of the emission intensities upon expiration of 2 minutes and 60 minutes after termination of irradiation, as compared with a ZnS:Cu yellowish green-emitting phosphorescent phosphor being 100%) and the peak temperature value of the glow curve, are shown in Table 1.

EXAMPLE 6

| | |
|---|---:|
| SrCO$_3$ | 35.1 g |
| BaCO$_3$ | 11.8 g |
| MgO | 4.0 g |
| SiO$_2$ | 12.0 g |
| Eu$_2$O$_3$ | 0.44 g |
| Dy$_2$O$_3$ | 0.56 g |
| NH$_4$Br | 1.6 g |

The above starting materials were thoroughly mixed, packed into an alumina crucible and baked at 1200° C. for 3 hours in a reducing atmosphere comprising 97% of nitrogen and 3% of hydrogen, by means of an electric furnace. The obtained baked product was pulverized and subjected to washing with water, drying and sieving to obtain a phosphorescent phosphor.

This phosphor had a composition of $Sr_{2.35}Ba_{0.6}MgSi_2O_8:Eu_{0.025}Dy_{0.3}Br_{0.015}$, and the emission spectrum under excitation with ultraviolet rays of 365 nm was as shown in FIG. 5 (curve c), whereby its peak had a bluish-emitting phosphorescence of 450 nm. Further, the afterglow characteristic showed a long afterglow, as shown in FIG. 9 (curve c). Further, the glow curve was as shown in FIG. 11 (curve c). Furthermore, the emission peak value of the phosphor, the afterglow characteristic (the emission intensity ratio of the emission intensities upon expiration of 2 minutes and 60 minutes after termination of irradiation, as compared with a ZnS:Cu yellowish green-emitting phosphorescent phosphor being 100%) and the peak temperature value of the glow curve, are shown in Table 1.

EXAMPLES 7 to 22

In the same manner as in Example 1, the hosphorescent phosphors of Examples 7 to 22 having compositions as disclosed in Tables 1 and 2, were obtained. The emission peak values of the phosphors of Examples 7 to 22, the afterglow characteristics (the emission intensity ratios of the emission intensities upon expiration of 2 minutes and 60 minutes after termination of irradiation, as compared with a ZnS:Cu yellowish green-emitting phosphorescent phosphor being 100%) and the glow peak temperature values are shown in Tables 1 and 2.

EXAMPLES 23 to 37

In the same manner as in Example 2, phosphorescent phosphors of Examples 23 to 37 having the compositions as disclosed in Table 4, were obtained. The emission peak values of the phosphors of Examples 23 to 37, the afterglow characteristics (the emission intensity ratios of the emission intensities upon expiration of 2 minutes and 60 minutes after termination of irradiation, as compared with a ZnS:Cu yellowish green-emitting phosphorescent phosphor being 100%) and the glow peak temperature values, were shown in Tables 3 and 4.

COMPARATIVE EXAMPLES 1 and 3

A $Sr_{1.995}MgSi_2O_7:Eu_{0.005}$ phosphorescent phosphor of Comparative Example 1 was obtained in the same manner as in Example 1 except that incorporation of the coactivator element Ln and the halogen element was omitted.

COMPARATIVE EXAMPLE 2

A $Sr_{2.97}MgSi_2O_8:Eu_{0.03}$ phosphorescent phosphor of Comparative Example 2 was obtained in the same manner as in Example 2 except that incorporation of the coactivator element Ln and the halogen element was omitted.

COMPARATIVE EXAMPLE 3

A ZnS:Cu yellowish green-emitting phosphorescent phosphor (LC-G1) manufactured by Kasei Optonix, Ltd. was used as a reference sample, and this was used as a phosphor of Comparative Example 3.

The emission peak wavelengths of the respective phosphors of these Comparative Examples 1 to 3, the afterglow characteristics (the emission intensity ratios of the emission intensities upon expiration of 2 minutes and 60 minutes after termination of irradiation, as compared with a ZnS:Cu yellowish green phosphorescent phosphor being 100%) and the peak values of the glow curves, are shown in Table 4.

INDUSTRIAL APPLICABILITY

By adopting the above-described construction, the present invention makes it possible to present for the first time a blue to green-emitting phosphorescent phosphor which is chemically stable and which exhibits high luminance and a far longer afterglow as compared with a commercially available ZnS type yellowish green-emitting phosphorescent phosphor, and thus substantially contributes to multi-coloring and diversification of display.

TABLE 1

| | Chemical compositional formula | Emission peak (nm) | Afterglow characteristics 5 minutes later | Afterglow characteristics 60 minutes later | Glow peak (° C.) |
|---|---|---|---|---|---|
| Ex. 1 | $Sr_{1.995}MgSi_2O_7:Eu_{0.005}Dy_{0.025}Cl_{0.025}$ | 470 | 480 | 1540 | 90 |
| Ex. 2 | $Sr_{2.97}MgSi_2O_8:Eu_{0.03}Dy_{0.025}Cl_{0.025}$ | 460 | 250 | 800 | 90 |
| Ex. 3 | $Sr_{1.995}Ca_{0.8}MgSi_2O_7:Eu_{0.005}Dy_{0.025}Br_{0.025}$ | 500 | 180 | 250 | 70 |
| Ex. 4 | $Sr_{2.07}Ca_{0.9}MgSi_2O_8:Eu_{0.03}Dy_{0.025}Cl_{0.02}$ | 471 | 155 | 350 | 85 |
| Ex. 5 | $Sr_{1.995}Ba_{1.0}MgSi_2O_7:Eu_{0.005}Dy_{0.025}Br_{0.025}$ | 450 | 195 | 440 | 100 |
| Ex. 6 | $Sr_{2.375}Ba_{0.6}MgSi_2O_8:Eu_{0.025}Dy_{0.03}Br_{0.015}$ | 450 | 150 | 200 | 80 |
| Ex. 7 | $Sr_{1.995}MgSi_2O_7:Eu_{0.005}Dy_{0.025}$ | 470 | 60 | 180 | 85 |
| Ex. 8 | $Sr_{1.995}MgSi_2O_7:Eu_{0.005}Dy_{0.025}Cl_{0.05}$ | 470 | 870 | 2530 | 95 |
| Ex. 9 | $Sr_{1.995}MgSi_2O_7:Eu_{0.005}Dy_{0.025}Br_{0.03}$ | 470 | 705 | 1830 | 95 |
| Ex. 10 | $Sr_{1.97}MgSi_2O_7:Eu_{0.03}Dy_{0.025}F_{0.01}$ | 470 | 195 | 280 | 80 |

TABLE 2

| | Chemical compositional formula | Emission peak (nm) | Afterglow characteristics 5 minutes later | Afterglow characteristics 60 minutes later | Glow peak (° C.) |
|---|---|---|---|---|---|
| Ex. 11 | $Sr_{1.97}MgSi_2O_7:Eu_{0.03}Dy_{0.025}Cl_{0.025}$ | 470 | 450 | 990 | 90 |
| Ex. 12 | $Sr_{1.97}MgSi_2O_7:Eu_{0.03}Dy_{0.02}Cl_{0.025}$ | 470 | 330 | 710 | 80 |
| Ex. 13 | $Sr_{1.995}MgSi_2O_7:Eu_{0.005}Nd_{0.025}Br_{0.025}$ | 470 | 75 | 210 | 70 |
| Ex. 14 | $Sr_{1.995}MgSi_2O_7:Eu_{0.005}Tm_{0.025}Br_{0.025}$ | 470 | 70 | 200 | 80 |
| Ex. 15 | $Sr_{1.995}MgSi_2O_7:Eu_{0.005}In_{0.025}Br_{0.025}$ | 470 | 45 | 120 | 75 |
| Ex. 16 | $Sr_{1.995}MgSi_2O_7:Eu_{0.005}Bi_{0.025}Br_{0.025}$ | 470 | 40 | 110 | 70 |
| Ex. 17 | $Sr_{1.995}MgSi_2O_7:Eu_{0.005}Sn_{0.025}Br_{0.025}$ | 470 | 45 | 110 | 80 |
| Ex. 18 | $Sr_{0.395}Ba_{1.6}MgSi_2O_7:Eu_{0.005}Dy_{0.025}Br_{0.025}$ | 470 | 45 | 230 | 90 |
| Ex. 19 | $Sr_{1.995}Mg_{0.9}Zn_{0.1}Si_2O_7:Eu_{0.005}Dy_{0.025}Cl_{0.025}$ | 470 | 525 | 1330 | 80 |
| Ex. 20 | $Sr_{1.995}MgSi_{1.96}Ge_{0.04}O_7:Eu_{0.005}Dy_{0.025}Cl_{0.025}$ | 470 | 330 | 1200 | 80 |
| Ex. 21 | $Sr_{1.995}Mg_{0.97}Cd_{0.03}Si_2O_7:Eu_{0.005}Dy_{0.025}Cl_{0.03}$ | 470 | 420 | 920 | 75 |
| Ex. 22 | $Sr_{1.995}Mg_{0.97}Be_{0.03}Si_2O_7:Eu_{0.005}Dy_{0.025}Cl_{0.025}$ | 470 | 395 | 900 | 80 |

TABLE 3

| | Chemical compositional formula | Emission peak (nm) | Afterglow characteristics 5 minutes later | Afterglow characteristics 60 minutes later | Glow peak (° C.) |
|---|---|---|---|---|---|
| Ex. 23 | $Sr_{2.97}MgSi_2O_8:Eu_{0.03}Dy_{0.025}$ | 460 | 40 | 150 | 80 |
| Ex. 24 | $Sr_{2.97}MgSi_2O_8:Eu_{0.03}Dy_{0.025}Cl_{0.05}$ | 460 | 300 | 800 | 90 |
| Ex. 25 | $Sr_{2.97}MgSi_2O_8:Eu_{0.03}Dy_{0.025}Br_{0.03}$ | 460 | 250 | 750 | 95 |
| Ex. 26 | $Sr_{2.97}MgSi_2O_8:Eu_{0.03}Dy_{0.025}F_{0.025}$ | 460 | 300 | 750 | 85 |
| Ex. 27 | $Sr_{2.97}MgSi_2O_8:Eu_{0.05}Dy_{0.025}Cl_{0.025}$ | 460 | 280 | 700 | 90 |
| Ex. 28 | $Sr_{2.97}MgSi_2O_8:Eu_{0.05}Dy_{0.025}Cl_{0.025}$ | 460 | 250 | 600 | 80 |
| Ex. 29 | $Sr_{2.97}MgSi_2O_8:Eu_{0.03}Nd_{0.025}Cl_{0.025}$ | 460 | 230 | 700 | 95 |
| Ex. 30 | $Sr_{2.97}MgSi_2O_8:Eu_{0.03}Tm_{0.025}Cl_{0.025}$ | 460 | 75 | 185 | 90 |
| Ex. 31 | $Sr_{2.97}Ca_{0.9}MgSi_2O_8:Eu_{0.03}In_{0.025}Cl_{0.025}$ | 460 | 70 | 175 | 95 |

TABLE 4

| | Chemical compositional formula | Emission peak (nm) | Afterglow characteristics 5 minutes later | Afterglow characteristics 60 minutes later | Glow peak (° C.) |
|---|---|---|---|---|---|
| Ex. 32 | $Sr_{2.97}MgSi_2O_8:Eu_{0.03}Bi_{0.025}Cl_{0.025}$ | 460 | 50 | 120 | 85 |
| Ex. 33 | $Sr_{2.97}MgSi_2O_8:Eu_{0.03}Sn_{0.025}Cl_{0.025}$ | 460 | 85 | 210 | 90 |
| Ex. 34 | $Sr_{2.97}Mg_{0.9}Zn_{0.1}Si_2O_8:Eu_{0.03}Dy_{0.025}Cl_{0.025}$ | 460 | 100 | 260 | 90 |
| Ex. 35 | $Sr_{2.97}Mg_{0.9}Cd_{0.1}Si_2O_8:Eu_{0.03}Dy_{0.025}Cl_{0.025}$ | 460 | 60 | 150 | 85 |
| Ex. 26 | $Sr_{2.97}Mg_{0.9}Be_{0.1}Si_2O_8:Eu_{0.03}Dy_{0.025}Cl_{0.025}$ | 460 | 50 | 125 | 90 |
| Ex. 37 | $Sr_{2.97}Mg_{1.95}Ge_{0.05}Si_2O_8:Eu_{0.03}Dy_{0.025}Cl_{0.03}$ | 460 | 43 | 115 | 80 |
| Comp. Ex. 1 | $Sr_{1.995}MgSi_2O_7:Eu_{0.005}$ | 470 | 3 | 0 | 80 |

TABLE 4-continued

| | Chemical compositional formula | Emission peak (nm) | Afterglow characteristics | | Glow peak (° C.) |
| | | | 5 minutes later | 60 minutes later | |
|---|---|---|---|---|---|
| Comp. Ex. 2 | $Sr_{2.97}MgSi_2O_8:Eu_{0.03}$ | 460 | 5 | 0 | 90 |
| Comp. Ex. 3 | ZnS:Cu | 516 | 100 | 100 | 120 |

We claim:

1. A phosphorescent phosphor represented by a compositional formula $m(Sr_{1-a}M^1_a)O \cdot n(Mg_{1-b}M^2_b)O \cdot 2(Si_{1-c}Ge_c)O_2Eu_xLn_y$, wherein $M^1$ is at least one element selected from Ca and Ba, $M^2$ is at least one element selected from Be, Zn and Cd, and the coactivator Ln is at least one element selected from Sc, Y, La, Ce, Pr, Nd, Sm, Gd, Tb, Dy, Ho, Er, Tm, Yb, Lu, B, Al, Ga, In, Tl, Sb, Bi, As, P, Sn, Pb, Ti, Zr, Hf, V, Nb, Ta, Mo, W, Cr and Mn, and wherein a, b, c, m, n, x and y are within the following ranges, and said phosphor contains at least one halogen element selected from F, Cl, Br and I in an amount within a range of from $1\times10^{-5}$ to $1\times10^{-1}$ g·atm/mol of the host material:

$0 \leq a \leq 0.8$ $0 \leq b \leq 0.2$ $0 \leq c \leq 0.2$ $1.5 \leq m \leq 3.5$ $0.5 \leq n \leq 1.5$ $1\times10^{-5} \leq x \leq 1\times10^{-1}$ $1\times10^{-5} \leq y \leq 1\times10^{-1}$.

2. The phosphorescent phosphor according to claim 1, wherein the above value m satisfies a condition represented by $1.7 \leq m \leq 3.3$.

3. The phosphorescent phosphor according to claim 1, wherein the above coactivator Ln is at least one element selected from Dy, Nd, Tm, Sn, In and Bi.

4. The fluorescent phosphor according to claim 1, which exhibits thermoluminescence at a temperature of at least room temperature, when heated after excitation with ultraviolet rays and/or visible light rays within a range of from 140 to 450 nm.

* * * * *